Nov. 30, 1954
C. H. KIRK, JR
2,695,753
HOT-WATER HEATING SYSTEM
Filed June 9, 1951
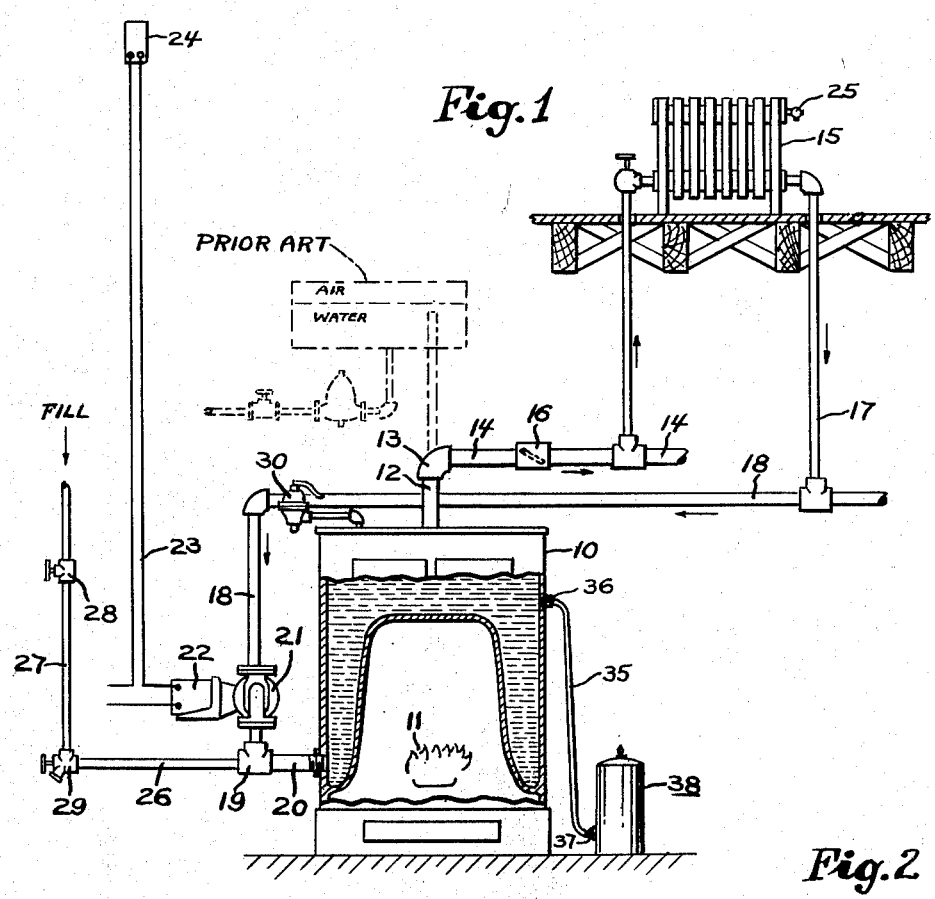
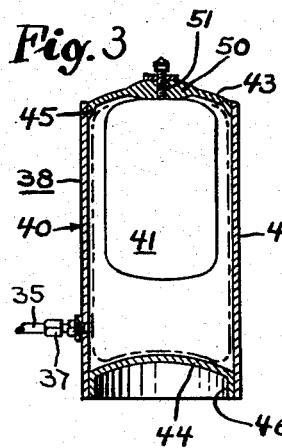
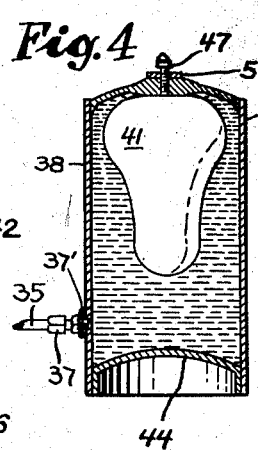
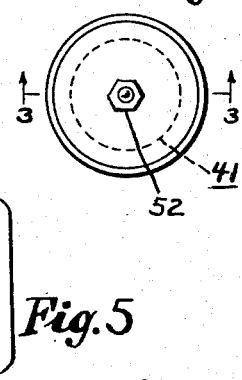
Inventor
CHESTER H. KIRK, JR.
By W Russell Greenwood
His Attorney United States Patent Office 2,695,753
Patented Nov. 30, 1954

2,695,753

HOT-WATER HEATING SYSTEM

Chester H. Kirk, Jr., Cranston, R. I., assignor to American Tube Products, Incorporated, a corporation of Rhode Island Application June 9, 1951, Serial No. 230,734

1 Claim. (Cl. 237—8)

This invention relates to closed hot water heating systems and has particular reference to storage means for the expanded hot water in heating systems of this type.

In the ordinary hot water heating systems of the closed type it is customary to employ a compression tank in which air is trapped by the incoming water when the system is first filled, and this reservoir of trapped air above the water level in the tank cushions the expansion of the water due to increase in temperature as well as against changing pressures which might produce undesirable stresses in any part of the system, or injure the boiler, as the boiler water is heated and cooled during normal operation of the heating system. Due to the fact that the compression tank is either separately connected to the boiler or is connected to the supply main issuing from the top of the boiler and leading to the radiators, the compression tank only traps a portion of the air in the system when the system is first filled. This condition holds true for air and gases that are liberated from the water when heated. The remaining air initially in the system, i. e., air in the boiler and the piping, tends to form air pockets in other parts of the system, usually at the highest points of the system, such as the upper portions of the radiators or convectors. This air is manually vented from the radiators or convectors in the usual manner at the time the system is first filled until the radiators are filled with water and the system contains no air except that which is trapped in the compression tank.

It is a well known fact that water contains air in the absorbed state in nearly direct proportion to its temperature, and that this air is liberated into the system when the water is heated and, as mentioned above, accumulates in the compression tank and other portions of the system with a consequent reduction in heating efficiency of the system thereby making a second venting of the radiators or convectors necessary. Also, the water as it is heated expands and moves into the compression tank, and thence by thermal circulation through the piping back to the boiler. When the temperature of the boiler water reaches the desired point, as determined by the setting of the boiler aquastat control, the firing of the boiler ceases and the water in the system begins to cool and contract. As it cools, that part of the boiler water that is in direct contact with the air in the compression tank absorbs some of the air of the tank, and by thermal circulation this air-charged water in the compression tank is changed continually so that in the next heating cycle this re-absorbed air is liberated into the system and is deposited in the system, i. e., piping and radiators, again. This reversible process is repeated as often as the firing cycle is repeated and the boiler water is heated and cooled, and over a period of time air is gradually and continually removed from the compression tank and released into the system. Eventually all the air is exhausted from the compression tank and the tank attains what is known in the trade as a "water-logged" condition. As a result of this loss of air cushion in the compression tank the pressure in the system will vary considerably during the heating cycle.

The water pressure in the system will drop when the firing cycle terminates and the water temperature goes down allowing more water to come into the system through the usual reducing valve in the supply line. This incoming water, of course, being cool and from an outside source contains absorbed air. Consequently, on the next heating cycle the water in the system expands, and since there is no air remaining in the compression tank to compress, due to the "water-logged" condition of the tank, this increased volume of water escapes from the system as the pressure increases through the relief valve into a drain. Also as it is heated the new water expels its small amount of air which is again deposited in the system and trapped at the high points. The water thus removed from the system is relatively free of air, but when the heating cycle ceases and the water in the system cools and contracts, it is again replaced by a new supply of water through the reducing valve containing absorbed air. The radiators or convectors, of course, collect this air and, therefore, must be vented often as this cyclic process continues so that the heating system will continue to perform efficiently to capacity. Aside from the loss of heat each time the relief valve opens and air-free water is removed from the system, it is found that, in hard water districts, the constant addition of new water into the system often causes the boiler to become fouled or "limed-up" thereby resulting in further loss in efficiency and objectionable operating characteristics.

It is accordingly one object of the present invention to provide a hot water heating system which is characterized by installation and operating advantages relative to an ordinary hot water system as outlined above by reason of the fact that the conventional compression tank is replaced by a liquid storage expansion compensator device in the form of a closed storage tank or container in which a source of pressure separated by a suitable elastic pressure-transmitting partition from the surplus water filling the tank from the heating system as it expands or contracts in volume during periods of increase and decrease in temperature is applied thereto and serves to keep said water under pressure and will insure the system being completely filled with boiler water at all times.

Another object of the invention is to provide in a hot water heating system a storage device for the expanded hot water from the heating system in the form of a closed tank or container provided inside with an expandible and deformable elastic bag which is inflated or precharged with a gas under pressure whereby the bag will be capable of being compressed or expanded according to the variations of volume of the tank chamber surrounding the bag under the effect of variations of the pressure of the boiler water supplied to or withdrawn from the tank, as the case may be, in response to changes in volume of the water in the heating system which take place due to increases and decreases in temperature of the boiler water as it is heated and cooled in the course of the normal cyclic operation of the heating system.

In the drawings:

Fig. 1 represents a diagrammatic elevation, partly in section, of a hot water heating system embodying my invention;

Fig. 2 is an enlarged top plan view of my liquid storage expansion compensator device shown in Fig. 1;

Fig. 3 is a vertical section on the line 3—3 of Fig. 2 of my liquid storage expansion compensator device used with the hot water heating system shown in Fig. 1, showing an expandible and deformable elastic bag within the tank and fixed thereto at one of its ends, the bag being represented in full lines before inflation and in broken lies as it appears when inflated to fill the tank chamber but prior to connection of the device with the hot water supply chamber of the boiler and entry of expanded hot water into the tank from the boiler;

Fig. 4 is a vertical section of my liquid storage expansion compensator device shown in Fig. 3 but showing the inflated bag deformed by the expanded water in the system and providing a cushioning device within the tank for the hot water in the system, and Fig. 5 diagrammatically shows, in elevation and partly in section, a detail of the elastic bag used in my expansion compensator device Referring to the drawing, there is shown in Fig. 1 a hot water boiler 10 of conventional design that may be fired in any desired manner as indicated at 11, and from the upper portion of which extends a supply riser 12 connected by an elbow 13 to a supply main or pipe line 14 by which hot boiler water is supplied to the radiators 15 in the heating system, one radiator being shown in the present instance connected to the supply main. A flow control valve 16 of the usual swing check type is interposed in the supply pipe line 14 between the boiler and the supply riser to the first radiator 15. The water is returned from the radiator 15 to the lower part of the water space of the boiler by a return pipe 17 and a return main or pipe line 18 which includes a T-connector 19 from which direct connection is made with the lower part of the water space of the boiler by a pipe 20. The return pipe line 18 may include a circulating pump 21 that is driven by a motor 22 connected by an electric circuit 23 to a room thermostat 24 which is functionally positioned to be affected by the radiator 15. It will be understood, of course, that the radiators 15 in the heating system may be grouped as desired in the building. The arrangement of the flow control valve 16 is such that when the pump 21 is operating the control valve 16 will lift to permit the flow of water to the radiators 15 and when the pump 21 ceases its operation the valve 16 will drop by gravity into a closed position. It will be understood, however, that the pump 21 may be located at any convenient part of the flow system other than in the return pipe line 18 here shown. The radiators 15 also may be each provided with an air vent valve 25, which may be either manual or automatic.

Additional supply water may be introduced into the boiler 10 and the system from time to time through the T-connector 19 and pipe 20 by means of pipes 26 and 27 and valve 28 which connect the boiler to a suitable water supply, such as the city water mains or other outside source. A drain valve 29 may be interposed between the pipes 26 and 27 in the boiler water refill pipe line.

Connected to the upper part of the water space of the boiler is the usual pressure relief valve 30 for relieving boiler water to a suitable drain (not shown) when the pressure in the system reaches or exceeds a predetermined amount, such as, for example, a pressure of the order of thirty pounds per square inch.

Connected with the boiler 10 by metal tubing 35, such as copper tubing, of small size and suitable compression fittings 36 and 37 of conventional design, is the device of the present invention herein referred to as an expansion compensator device and generally designated herein by the numeral 38. As illustrated, the upper end of the tubing 35 is connected with the boiler water space of the boiler by the fitting 36 which has threaded connection with a suitable hole in the side wall of the boiler. The fitting 37 has threaded connection with a suitable hole 37' provided in the lower wall part of the tank and connects the lower end of the tubing 35 to the tank for conveying the boiler water to and from the tank chamber. The detailed construction of the device 38 is shown in Figs. 3 and 4 and comprises a rigid cylindrical container or tank 40 forming the outer casing of the expansion compensator device 38 and accommodating within its interior an elastic expandible or deformable bag 41. The tank 40 may be of a welded fabricated steel plate construction and as shown in Fig. 3 has for its body portion a hollow cylindrical or tubular shell 42 with dished heads 43 and 44 pressed into the opposite ends of the shell and affixed therein as by welding of the peripheral flanges 45 and 46 of the respective heads to the inner wall of the shell. The bag 41 preferably is molded of a vulcanized synthetic rubber, such as butyl rubber, neoprene, etc. The bag 41 has molded into one of its ends a suitable charging valve here shown as comprising a conventional tire valve 47 having an exteriorly threaded metallic valve stem 48 which contains a valve spring member, not shown, and forms the inlet for compressed air or other gas under pressure employed for precharging and initially inflating the bag. The bag 41 is suspended within the tank 40 and attached to one end wall thereof by the stem 48 of the charging valve 47 which projects outwardly through the central hole 50 provided in the thickened wall portion 51 of the head 43. The bag 41 is held in liquid-tight seating engagement against the inner end face of the thickened wall portion of the head 43 by screwing down a nut 52 threaded upon the outwardly projecting body portion of the valve stem 48. Suitable packing material may be provided between the underside of the nut 52 and the outer end face of the thickened wall portion of the head 43, if desired.

The operation of the hot water system with my expansion compensator device 38 is as follows: When the uncharged bag 41 is initially inserted inside the tank 40 it takes the position shown in full lines in Fig. 3. The bag is initially inflated at low pressure, viz., from 10 to 20 pounds pressure. Upon precharging the elastic bag with air or a gas under pressure, the bag 41 is expanded and comes to bear against the top, bottom and side surfaces of the inside surfaces of the tank 40, to take the position shown in broken outline in Fig. 3, this, of course, being prior to connection of the device 38 with the boiler water space of the boiler and supplied with water therefrom. When the tank 40 is connected with the boiler water space of the boiler 10 by means of tubing 35 and fittings 36 and 37, the inflow of hot water from the upper chamber of the boiler into the interior chamber of the storage tank 40 surrounding the bag 41 will cause the bag to be compressed or expanded by the pressure of the surrounding water, in which instance the bag will assume either the shape shown in full lines in Fig. 4 or the shape indicated by the broken lines in Fig. 4 wherever its volume increases or decreases as a consequence of the inflow and/or outflow of boiler water from the space within the tank 40 surrounding the exterior of the bag 41 incident to expansion or contraction of the boiler water in the course of the normal cyclic operation of the heating system. It will be understood, of course, that the bag 41 will be compressed by the boiler water entering the tank chamber until the pressure of the gas inside the bag reaches the pressure of the water filling the tank chamber about the bag. Whenever the pressure inside the bag exceeds the pressure of the water surrounding said bag, the bag will exert pressure on the water in the tank chamber to keep the heating system filled as the boiler water is expelled from the tank on being cooled in response to the low temperature period of the boiler operation.

It will now be appreciated that the invention provides a hot water heating system having the following advantages over the conventional systems:

1. Low initial cost.
2. Low installation cost.
3. Elimination of the reducing valve usually required.
4. Increases the efficiency of the system.
5. Permanently eliminates air from the system and all troubles encountered with air in the system.
6. The tank 40 can be installed at any level, in any position, and at any location because of its small size; and it even can be hidden from view inside the boiler jacket.
7. Elimination of piping for connection of the device into the system since the tank can be connected into the system with small diameter copper tubing and conventional compression fittings; consequently no special skill, tools or fittings are required for installation.
8. System is always shut off from local water supply thus providing insurance against water damage if system springs a leak.
9. While in operation the device always has the power to maintain the head in the system due to its kinetic energy reserve.

While I have herein shown and described a typical embodiment of my invention, it will be understood that the invention may be embodied in other forms without departing from the spirit or scope thereof, limited only by the scope of the appended claim.

What is claimed is:

In a closed hot water heating system having one or more radiating devices, the combination of a boiler having a hot water space, supply and return conduit means providing a flow circuit for circulation of hot water between the boiler and the radiating devices and back to the hot water space of the boiler, a pump thermally responsive to the heat demands of the radiating devices for forcibly circulating hot water through the system, an expansion compensator tank for accumulating the expanded hot boiler water and placed on the floor beside the boiler in an upright position, said expansion tank including a closed housing, elastic partition means within the housing dividing it into upper and lower non-communicating chambers the lower one of which receives expanding hot water forced therein from the boiler and the system, and the upper chamber normally being precharged with a gas compressed to a predetermined pressure sufficient to expand said elastic partition means into said lower chamber of the tank housing whereby it cushions the expanding water forced into the tank and expels it therefrom as it cools and recedes back into the boiler, and small diameter metal tubing connecting a side opening of the lower chamber of said tank with a side opening of the upper part of the hot water space of said boiler.

References Cited in the file of this patent

UNITED STATES PATENTS

| Number | Name | Date |
|---|---|---|
| Re. 23,437 | Mercier | Dec. 4, 1951 |
| 402,076 | Gates | Apr. 23, 1889 |
| 2,170,507 | Rice | Aug. 22, 1939 |
| 2,311,177 | Johnson | Feb. 16, 1943 |

FOREIGN PATENTS

| Number | Country | Date |
|---|---|---|
| 875,664 | France | June 29, 1942 |